US005402362A

United States Patent [19]
Prosser

[11] Patent Number: 5,402,362
[45] Date of Patent: Mar. 28, 1995

[54] METHOD OF UTILIZE TRIAL DYEINGS TO IMPROVE COLOR FORMULATIONS

[75] Inventor: Robert A. Prosser, Holliston, Mass.

[73] Assignee: The United States of America as represented by the Secretary of the Army, Washington, D.C.

[21] Appl. No.: 290,452

[22] Filed: Aug. 12, 1994

Related U.S. Application Data

[63] Continuation of Ser. No. 886,591, May 21, 1992, abandoned.

[51] Int. Cl.⁶ ............................. G01J 3/00; G01J 3/46
[52] U.S. Cl. ................................. 364/526; 356/402; 356/408; 356/421; 356/423
[58] Field of Search ............... 356/402, 408, 421, 423, 356/425, 326; 364/526; 434/98

[56] References Cited

U.S. PATENT DOCUMENTS

| | | | |
|---|---|---|---|
| 4,159,874 | 7/1979 | Dearth et al. | 356/73 |
| 4,241,520 | 12/1980 | Norton | 434/102 |
| 4,369,640 | 1/1983 | Fox | 68/205 R |
| 4,511,229 | 4/1985 | Schwartz et al. | 354/20 |
| 4,966,461 | 10/1990 | Hooper | 356/406 |

OTHER PUBLICATIONS

R. A. Prosser et al., "Color Matching Spanning the Visible and Near-Infrared: Use of the Cubic Spline Function in Interpolation," Technical Report Natick/TR-90/006, Nov., 1989.

Stearns, "The Practice of Absorption Spectroscopy," Wiley-Interscience, pp. 257-258, New York, 1969.

E. Allen, "Basic Equations Used in Computer Color Matching," J. Opt. Soc. Am., vol. 56, No. 9, pp. 1256-1259, 1966.

Park and Stearns, "Spectrophotometric Formulation," J. Opt. Soc. Am., vol. 34, No. 2, pp. 112-113, 1944.

E. Allen, "Basic Equations Used in Computer Color Matching, II. Tristimulus Match, Two-Constant Theory," J. Opt. Soc. Am., vol. 64, No. 7, pp. 991-993, 1974.

Primary Examiner—Emanuel T. Voeltz
Assistant Examiner—Kamini S. Shah
Attorney, Agent, or Firm—John H. Lamming; Richard J. Donahue

[57] ABSTRACT

For a given set of dyes, chosen to match a target (standard) color, by combining the a priori percent reflectance and concentration data of primary (calibration) dyeings with that of one or more trial dyeings, a calculated formulation can be obtained which agrees with one of the trial formulations used, or the average, as precisely as desired. A match, color or spectral, to a target color, near to the color of the trial dyeing in color space, is obtained that is, for all practical purposes, as accurate as those dyes permit.

15 Claims, 8 Drawing Sheets

METHOD OF UTILIZE TRIAL DYEINGS TO IMPROVE COLOR FORMULATIONS

STATEMENT OF GOVERNMENT USE

The invention described herein may be manufactured, used, and licensed by or for the Government for Governmental purposes without the payment to me of any royalty thereon.

This is a continuation of application Ser. No. 07/886,591, filed on May 21, 1992, now abandoned.

FIELD OF THE INVENTION

The instant invention is directed to the field of color matching, and more particularly, to a method utilizing trial dyeings to improve color formulations.

BACKGROUND OF THE INVENTION

In trying to match a target (standard) shade based on an unknown set of dyes, the first trial dyeing is frequently not acceptable. The main reasons are usually that the current dye batches are of a different shade and strength than the dye batches used to dye the primary (calibration) dyeings, the dyeability of the cloth or other substrate is different from that used for the primaries or target, the additive function used in calculation of the formulation is inaccurate, and other errors whatever they might be.

One, therefore, uses the trial dyeing to calculate a corrected formulation. Commercial algorithms used in the color formulation and correction computations are often trade secrets, so that the way that the color formulation for the trial dyeing is calculated, and the way the trial dyeing is used to correct the initial formulation are closely guarded. Often a second trial dyeing is required using the knowledge obtained from the first trial formulation and dyeing, and the process repeats until an acceptable color match is, perhaps, obtained.

Color matching is based on the a priori primary dyeings of the individual dyes. For each dye, the primary dyeings consist of a set of dyeings on cloth at a series of usually four or more concentrations. The concentrations span the usable range of the dye. Percent reflectance values versus wavelength data, the spectrum, for each concentration as well as the concentration are then stored in a dye data bank.

A spectrum, accordingly, is a plot of percent reflectance versus wavelength. The wavelength range usually covered is from four-hundred (400) to seven-hundred (700) nanometers, the visible range. Additional ranges, such as seven-hundred (700) to nine-hundred (900) nanometers (the near-infrared) can be included/-covered without any basic change in the algorithms used in the computations. The percent reflectance values of a sample at given wavelengths are obtained using a spectrophotometer. These instruments are commercially available.

In a spectrophotometric match one tries to find the set of dyes which when dyed to form a trial dyeing provides a spectrum which is practically congruent with the spectrum of the target shade. Similarly, in a colorimetric match, one tries to find the set of dyes which when dyed to form the first trial dyeing provides the tristimulus values X, Y, and Z (the color coordinates in color space) which are closest to the tristimulus values of the target. Technical Report Natick/TR-90/006 titled "Color Matching Spanning the Visible and Near-Infrared: Use of the Cubic Spline Function in Interpolation", by R. A. Prosser and G. Arruda, U.S. Army Natick RD&E Center, Natick, Mass. 01760-5019, November 1989, describes a spectrophotometric algorithm for use in color formulation, incorporated herein by reference, a book entitled "The Practice of Absorption Spectroscopy", by Stearns, Wiley-Interscience at pp. 257-8 (NY, 1969), incorporated herein by reference, and reports entitled "Basic Equations Used in Computer Color Matching" by Allen, 56 J. Opt. Soc. Am 1256-9 (1966) and "Basic Equations Used in Color Matching, II. Tristimulus Match, Two-Constant Theory" by Allen, 64 J. Opt. Soc. Am. 991-3 (1974), both incorporated herein by reference, describe the colorimetric algorithms for use in color formulation.

The other references are discussed in the specification of the above-identified invention.

In the former report, a color-matching process is described where the additive function used is the Kubelka-Munk equation. It has the property that, at any given wavelength, the sum of its values for the individual a priori primary dyes used to prepare the trial dyeing adds approximately to the value for the trial dyeing. There are two steps in the color-matching process. The first step is the color formulation step. The formulation when dyed results in the first trial dyeing. The shade of the first trial dyeing rarely matches the target color well enough to be acceptable. The next step is the color correction step.

The color correction step in the former report involved an empirical correction that generated a mathematical "standard", in addition to the reflectance data for the a priori dyes and the reflectance data for the trial dyes. However, the empirical correction described therein was based on estimation, and was, therefore, primarily subjective, since it left the measure of the correction to the free judgment of the color formulator. This procedure is probably typical of those used commercially. On this basis, even experienced personnel require many more trial dyeings in trying to obtain an acceptable match.

SUMMARY OF THE INVENTION

It is accordingly the principal object of the present invention to provide a novel method that utilizes trial dyeings to improve color formulations. In accord therewith, a target (standard) shade is specified, and the appropriate dye data base selected. In the initial step, the color formulation step, a formulation, which consists of a set of a priori dyes in the data base and their concentrations, and which provides the optimum match for that set of dyes, is calculated. Negative dye concentrations are not allowed. This procedure is iterated with other sets of dyes from the same data base, usually in a systematic manner, and the set which gives the closest calculated match, has the lowest cost, and/or best physical properties, etc., to the target is chosen as the first trial formulation.

In further accord therewith, and in the next step, a trial dyeing using the calculated concentrations of the trial dyes as given by the first trial formulation is dyed, and its reflectance spectrum obtained. In further accord therewith, and in the next step, the spectrum of the dyed trial dyeing is substituted for that of the target color, and is analyzed into its constituent trial dye concentrations based on the same set of a priori primary dyes. The variance between the trial dye concentrations used and the subsequent constituent trial dyeing concentrations calculated, is indicative of the error introduced by dye batches subsequent to those used to dye the a priori primary dyes, different dye substrates, inaccuracy of the additive function, or other errors whatever they might be. For a given set of dyes, analysis of a trial dyeing into its constitutive trial dye concentrations may alternatively be implemented either colorimetrically or spectrophotometrically without departing from the inventive concept.

In further accord therewith, and in the next step, the constituent trial dye data (percent reflectance values, wavelengths, and concentrations) for the first trial dyeing are mathematically included (combined) with the a priori dye data (also percent reflectance values, wavelengths, and concentrations), since the data in each case consists of percent reflectance values, wavelengths, and concentrations. The a priori primary dye data is then adjusted (raised, lowered, shifted laterally, compressed, expanded, and/or weighted), as appropriate and dictated by the data, to temporarily correct the a priori primary dye data to provide the known constituent trial dye concentrations. This corrects the a priori dye data for variations in substrate dyeability, dye batch variation, inaccuracy in the additive function, and other errors whatever they might be so that the data base more accurately represents current conditions.

In further accord therewith, and in the next step, new constituent trial dye concentrations to match the target shade are calculated on the basis of the corrected a priori dye data. In further accord therewith and in the next step, iteration of the algorithm will provide greater accuracy if needed.

In further accord therewith, and in the next step, the temporary corrections can be made permanent if desired.

In further accord therewith and in the next step, the new formulation for the target shade calculated is dyed, which has been found to provide, on a practical basis, as accurate a match to the target shade as those dyes permit.

BRIEF DESCRIPTION OF THE DRAWINGS

Other objects, aspects and features of the present invention will become apparent as the invention becomes better understood by referring to the following detailed description of the preferred embodiment, and to the drawings, wherein.

DETAILED DESCRIPTION OF THE PREFERRED EMBODIMENT

Figure 1:
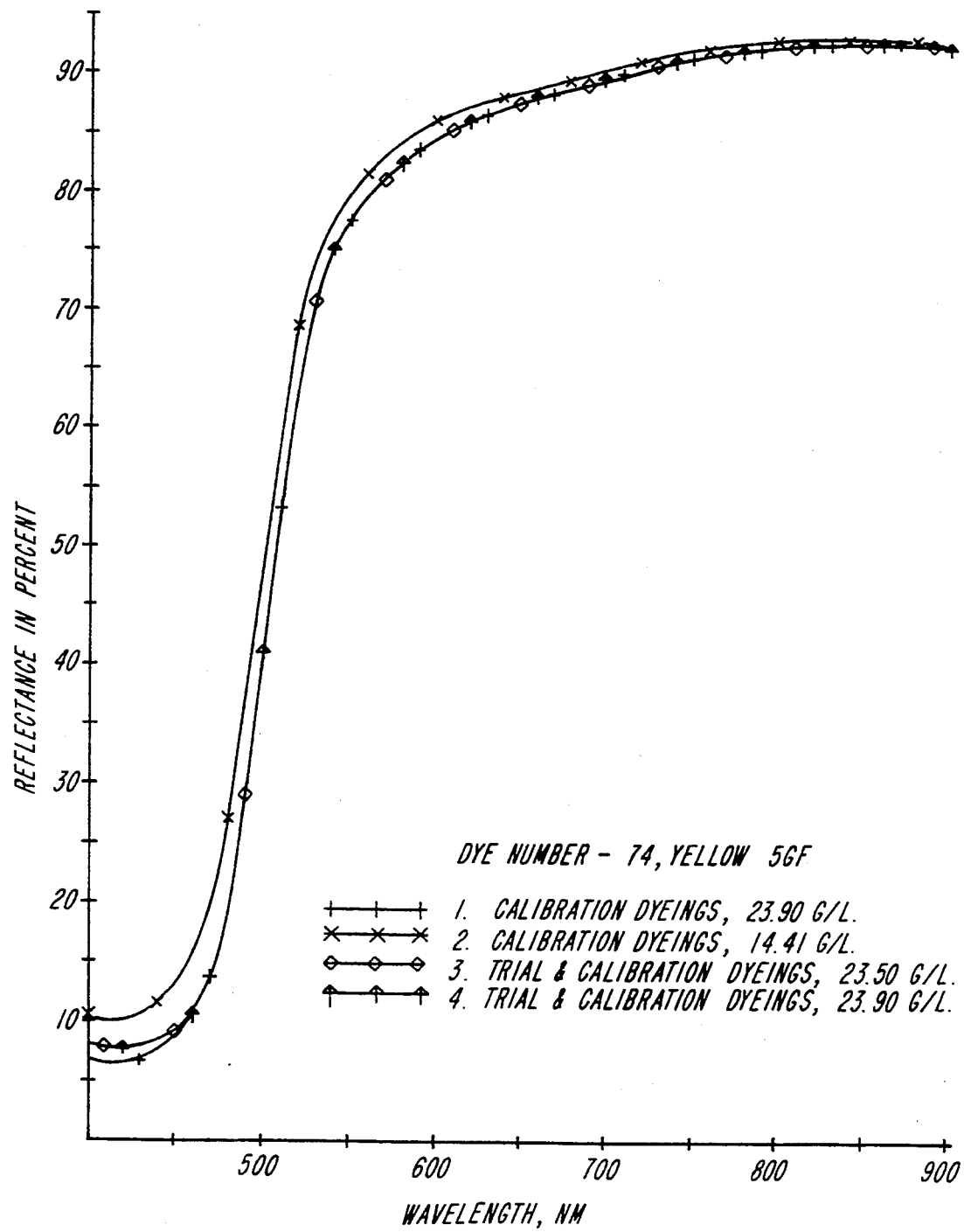
FIGS. 1-8 are graphs plotting percent reflectance values versus wavelength that are useful in explaining the novel method utilizing the trial dyeings to improve color formulations of the instant invention applied to two exemplary target shades, namely, the "Dark Green 355" and the "Brown 356" used in the so-called Woodland pattern of the Army's Battle Dress Uniform.
Figure 2:
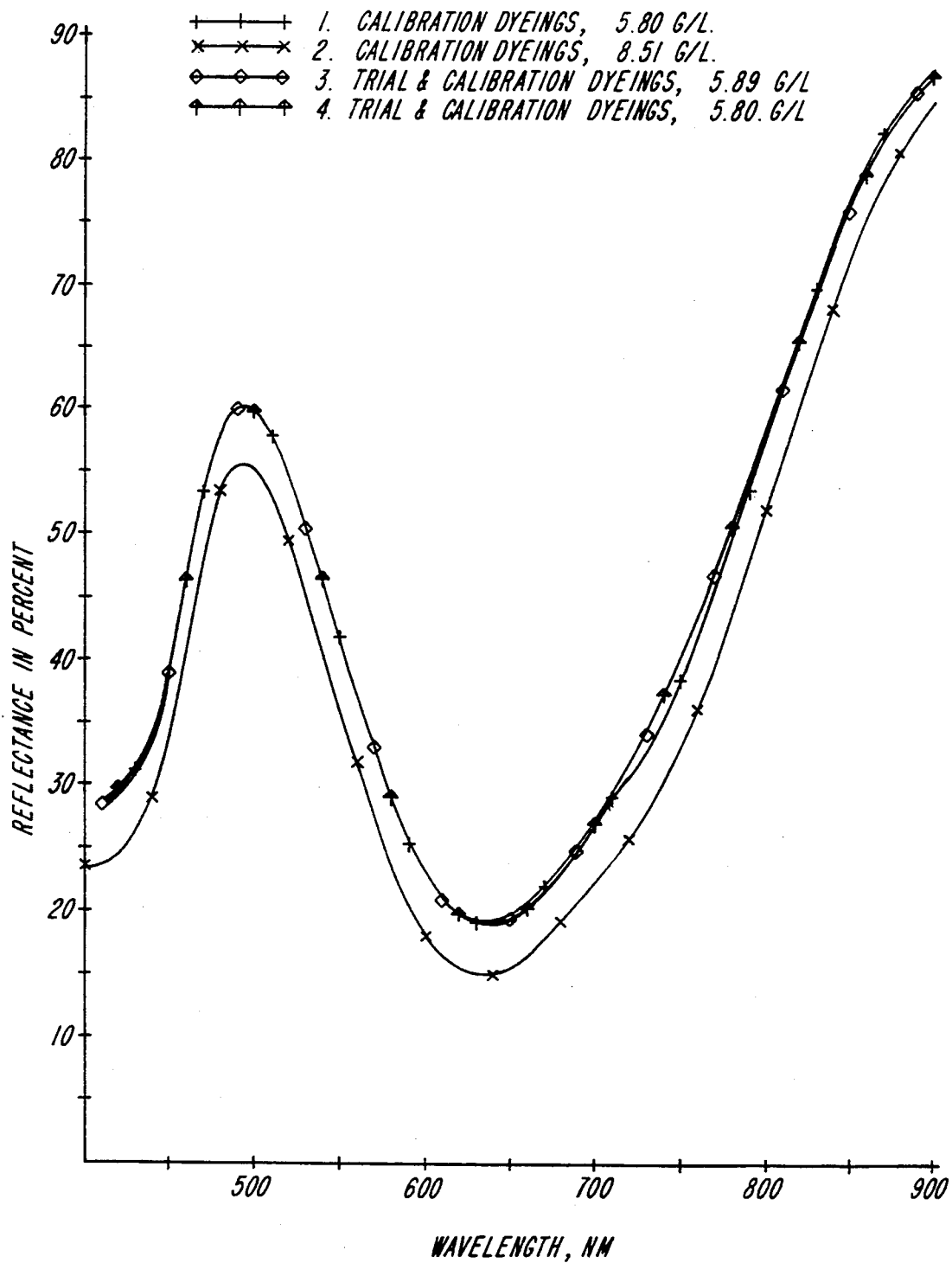
Figure 3:
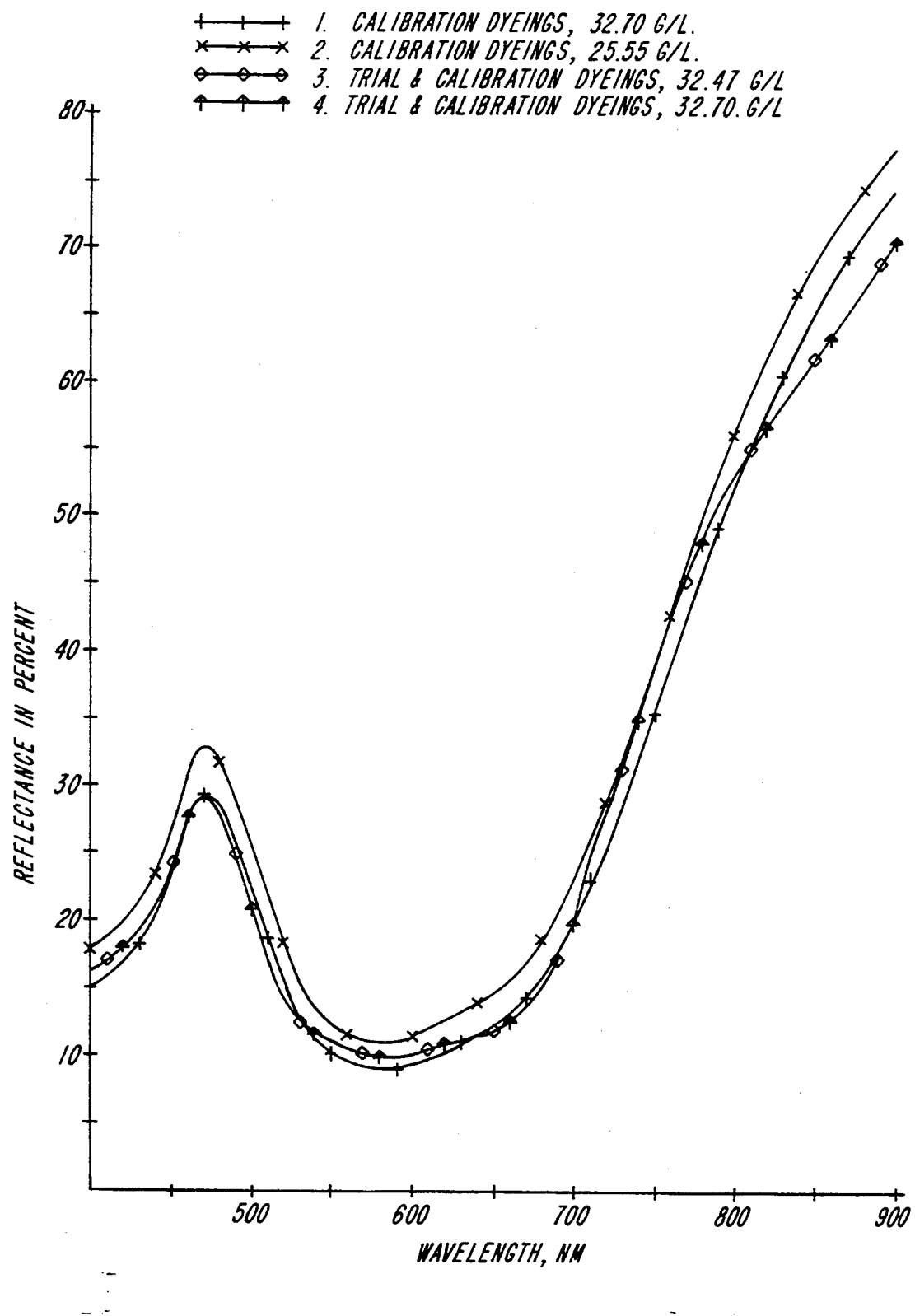
Figure 4:
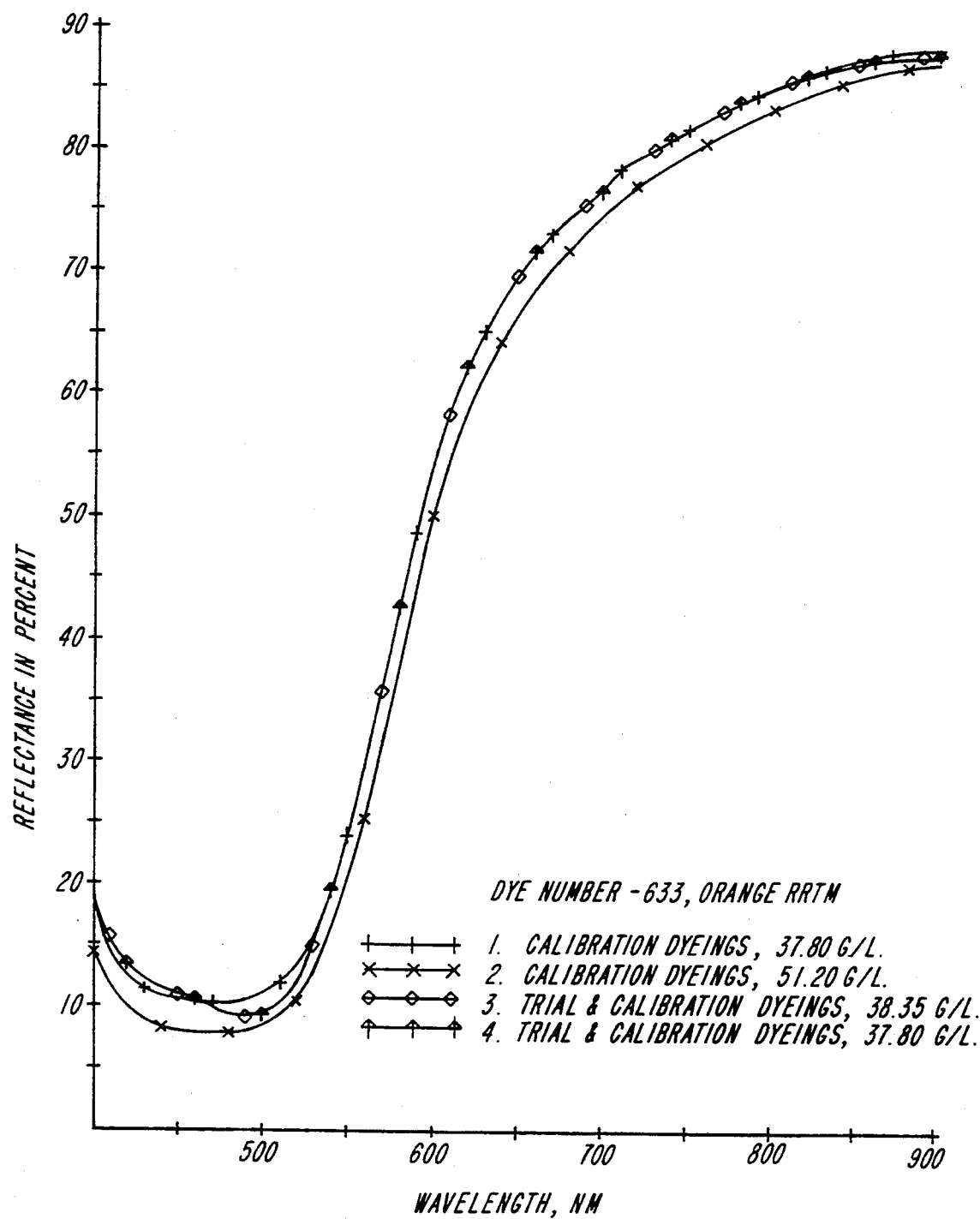

The Table hereinbelow shows four formulations of constituent vat dye concentrations labelled one (1), two (2), three (3), and four (4) used to dye "Dark Green 355" as one example of and five (5), six (6), seven (7), and eight (8) used to dye "Brown 356" as another example of a target shade, using organic dyes with cloth substrates, although, as will be appreciated, the invention has utility to dye target shades other than the exemplary shades as well as utility with other classes of dyes, such as acid, disperse, and direct. Also systems, such as paints, inks, and plastics, among others, and their corresponding colorants, may be used. Some modification of the calculations may be desirable where two-constant theory and the Lambert-Beer Law (transmitted light) are involved.

For these two target shades, the initial formulations (1) and (5) of the Table are based on a priori primary (calibration) dyeings, available in the form of dyed cloth or yarn at four or more concentration levels for each a priori dye. The formulations were calculated using the Kubelka-Munk additive function to relate K/S values (parameters) to reflectance data of the target shades and primary dyeings, and using a least squares fit to relate K/S values of the primary dyeings to concentration at each wavelength. The mathematical implementation is described more fully hereinbelow. It differs from the procedure of the article "Color Matching Spanning the Visible ...", discussed in the Background of the Invention, in the respect that there a cubic spline function instead of a polynomial was used to calculate concentrations, and in the respect that color correction there was based on estimation instead of the rigorous mathematical procedure described hereinbelow. Besides polynomials, other functions may be used where practicable.

Using the calculated concentrations of the constitutive primary dyes given in formulations (1) and (5), a current batch of organic dyes, the Yellow 5GF, Br. Green, Navy Blue G, and Orange RRTM of the Table, were dyed in a first trial dyeing on a cloth substrate. A spectrum of the trial dyeing was then obtained using a spectrophotometer, and a second formulation of constitutive dye concentrations was calculated therefrom, using the same procedure. The second formulations (2) and (6) differ substantially from the initial formulations for the two target shades, which differences are attributable to a difference in the dyeability of the cloth, to a difference between the current dye batches and those used to the dye the primaries, and to inaccuracies in the Kubelka-Munk (additive) function used in the calculations, among other errors.

TABLE

| | CALCULATED CONCENTRATIONS, G/L, FOR DARK GREEN 355 and BROWN 356 | | | |
|---|---|---|---|---|
| | PRIMARY DYEINGS | | PRIMARY & TRIAL DYEINGS | |
| | DARK GREEN 355 | | | |
| FORMULATION | 1 | 2 | 3 | 4 |
| Dye | Target | Trial | Trial | Target |
| Yellow 5GF | 23.90 | 14.38 | 23.50 | 23.90 |
| Br. Green | 5.80 | 8.50 | 5.89 | 5.80 |
| Navy Blue G | 32.70 | 25.57 | 32.70 | 32.70 |
| Orange RRTM | 37.80 | 51.18 | 38.34 | 37.80 |
| | BROWN 356 | | | |
| FORMULATION | 5 | 6 | 7 | 8 |
| Dye | Target | Trial | Trial | Target |
| Yellow SGF | 20.10 | 5.07 | 19.77 | 20.10 |
| Br. Green | 6.70 | 10.12 | 6.76 | 6.70 |
| Navy Blue BF | 34.30 | 23.04 | 34.09 | 34.30 |
| Orange RRTM | 66.30 | 81.57 | 66.67 | 66.30 |

The spectra of the individual dyes based on the primary dyeings and the spectra of the same dyes based on the primary and trial dyeings (i.e., the dye data base corrected in a manner described hereinbelow) are calculated and plotted in FIGS. 1-8. Plots 1 to 4 of FIG. 1 give the spectra that corresponds to the concentrations of Yellow 5GF given in the formulations 1-4 of the Table. The other dyes, Br. Green, Navy Blue G, and Orange RRTM are similarly treated in corresponding plots 1 to 4 of respective FIGS. 2–4, for the target shade Dk. Green 355. Similarly, plots 1–4 of FIGS. 5–8 give the spectra that corresponds to the concentrations of Yellow 5GF, Br. Green, Navy Blue BF, and Orange RRTM for the target shade Brown 356. (Formulations (1) and (4) of the Table are the same, and so are formulations (5) and (8). The formulations are repeated herein for convenience in discussing the spectra.)

Each figure shows four plots. For Dark Green 355 and Yellow 5GF, the first plot of FIG. 1 shows the spectrum of that dye at a concentration of "23.90" g/L, obtained from the initial formulation (Table, Formulation (1)), which was calculated from the spectrum of the target color using only the primaries by a spectrophotometric color formulation procedure described herein. The second plot gives the spectrum of the same dye at a concentration of "14.38" g/L, (Table, Formulation (2)), which was calculated from the spectrum of the first trial dyeing using only the primaries by the same color formulation procedure. The error is thirty-eight (38) percent, $[(100) \times (23.90 - 14.80)/23.90 = 38\%]$.

Analysis of any shade into its constituent a priori dye concentrations, where the dyes are known, may alternatively be implemented either colorimetrically or spectrophotometrically without departing from the inventive concept.

In accord with the present invention, the trial dyeing data (percent reflectance values, wavelengths, and dye concentrations) and the a priori dye data (also percent reflectance values, wavelengths and dye concentrations) were then mathematically combined (included) in a manner described hereinbelow, and the a priori dye data corrected by raising, lowering, compressing, expanding, shifting data points laterally, or by changing their weightings, as appropriate and as dictated by the data itself. A new formulation, based on the corrected data bank and the spectrum of the first trial dyeing was then calculated using the same color formulation procedure. See Formulation (3) of the Table. The concentration of Yellow 5GF was then found to be "23.50" g/L. The spectrum for this color at said concentration was calculated using the data bank corrected in a manner described below and is shown as plot 3 in FIG. 1. Plots 3 and 4 of FIG. 1 show the spectra of Yellow 5GF at concentrations of "23.50" and "23.90" g/L respectively, based on the corrected a priori dye data. The maximum error in this case for the four dyes is on the order of two percent (2%). Further accuracy, if needed, can be obtained by iteration of the procedure.

Plots 1 and 4 are at the same concentration, "23.90" g/L. Plot 1 is based only on the a priori primary dye data; plot 4 is based on the corrected data values of the same set of a priori primary dyeings. In other words, although the concentrations for plots 1 and 4 of each figure are the same, the plots differ because Plot 1 is based on the a priori primary dyeings only, whereas Plot 4 is based on the primary dyeings after correction using the spectra of both the a priori primary dyeings and the trial dyeing as indicated by the headings of the Table. The spectra differ noticeably in the "400–450" nm range. The difference in plots 1 and 4 constitute the error due to the aforementioned variances. The difference in plots 3 and 4 is negligible by comparison with the difference in plots 1 and 4.

Figure 5:
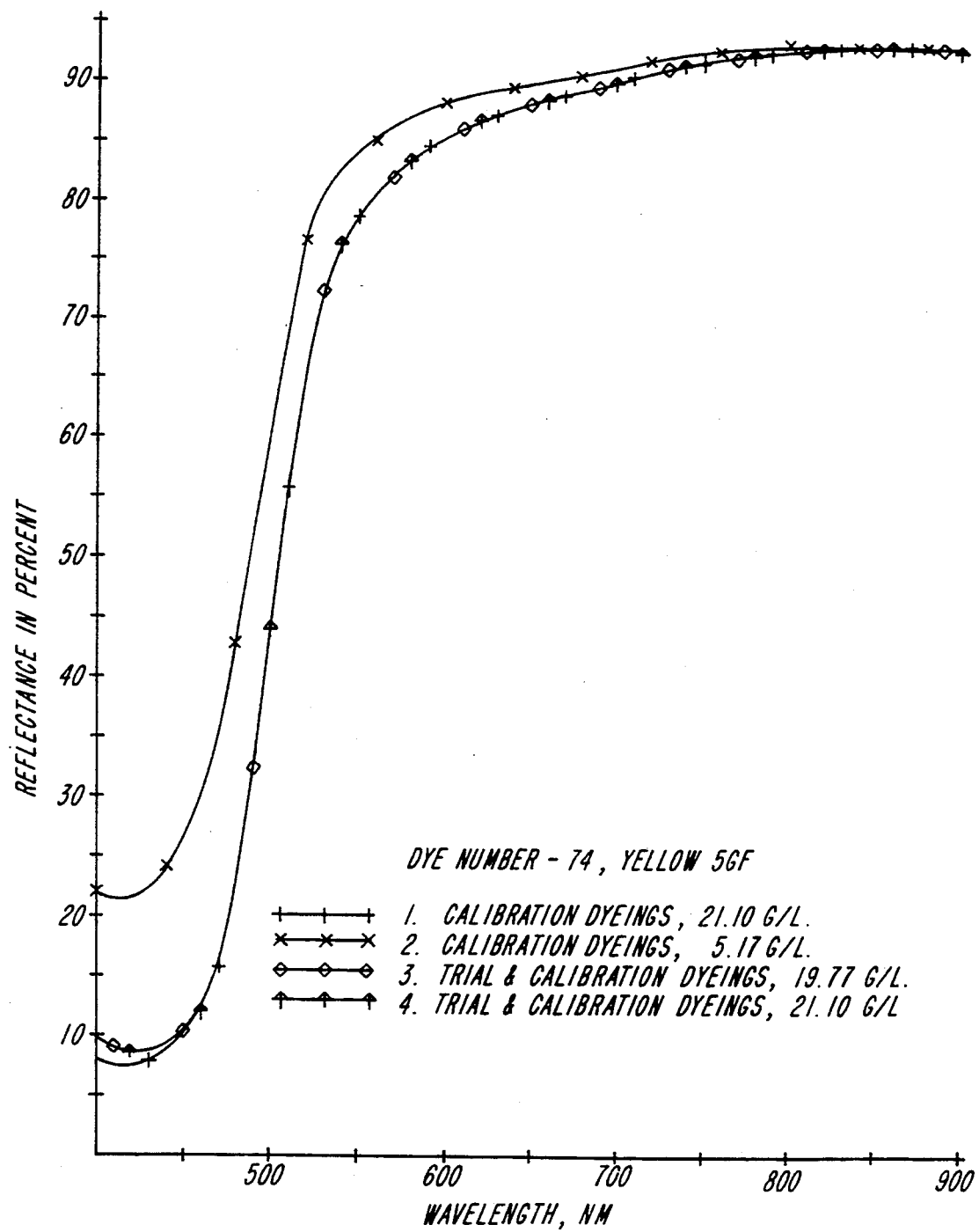
Figure 6:
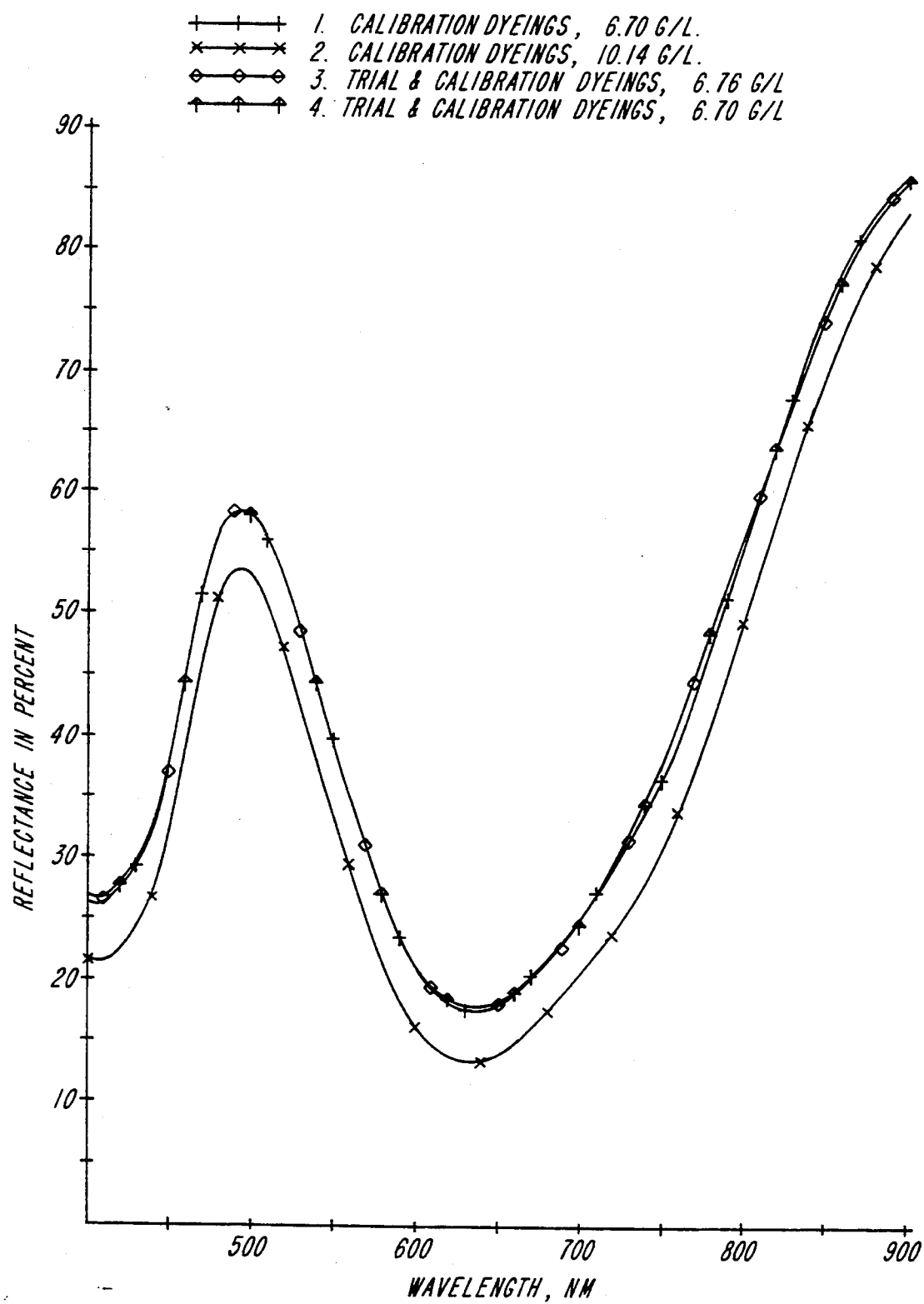
Figure 7:
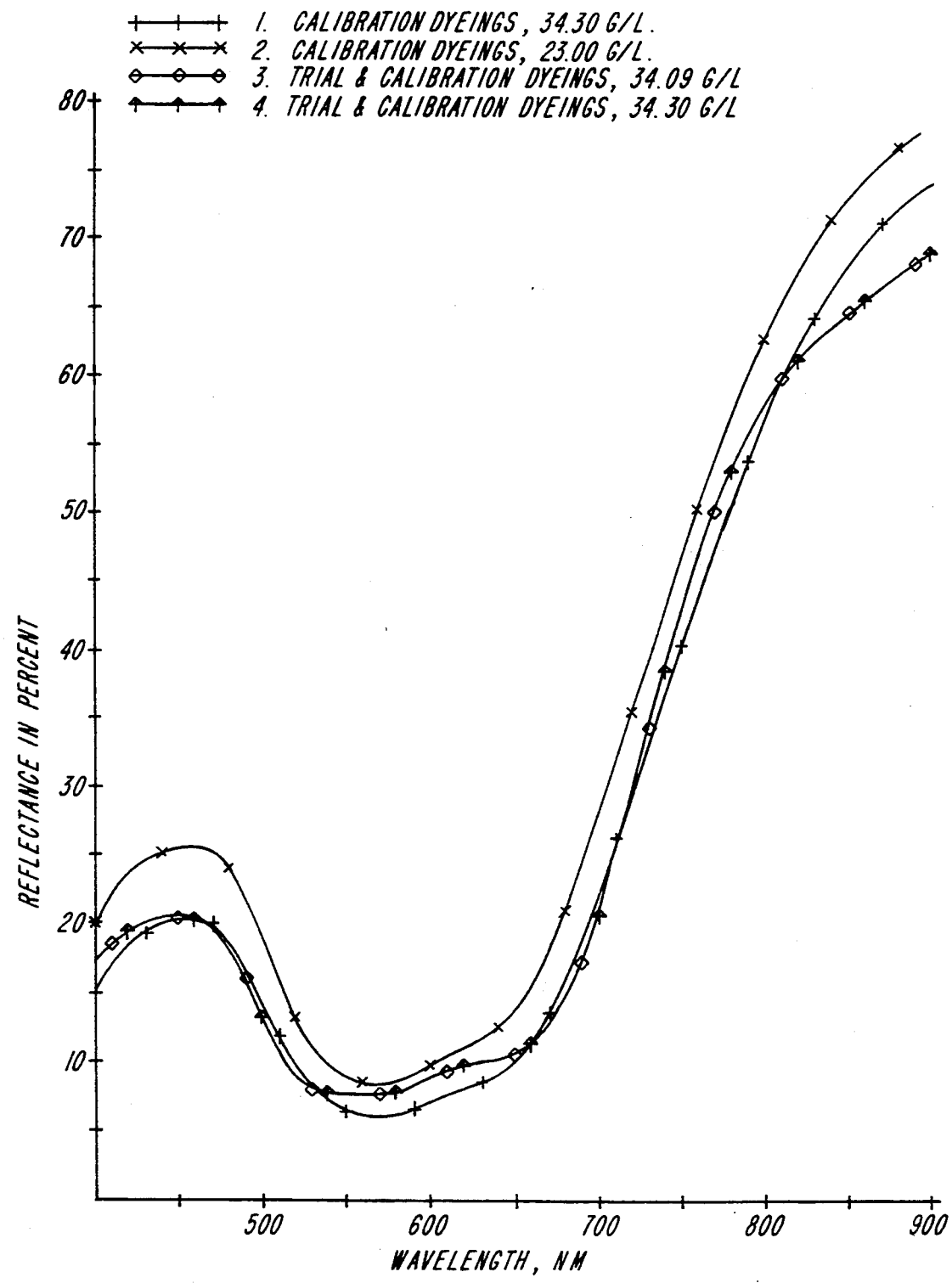
Figure 8:
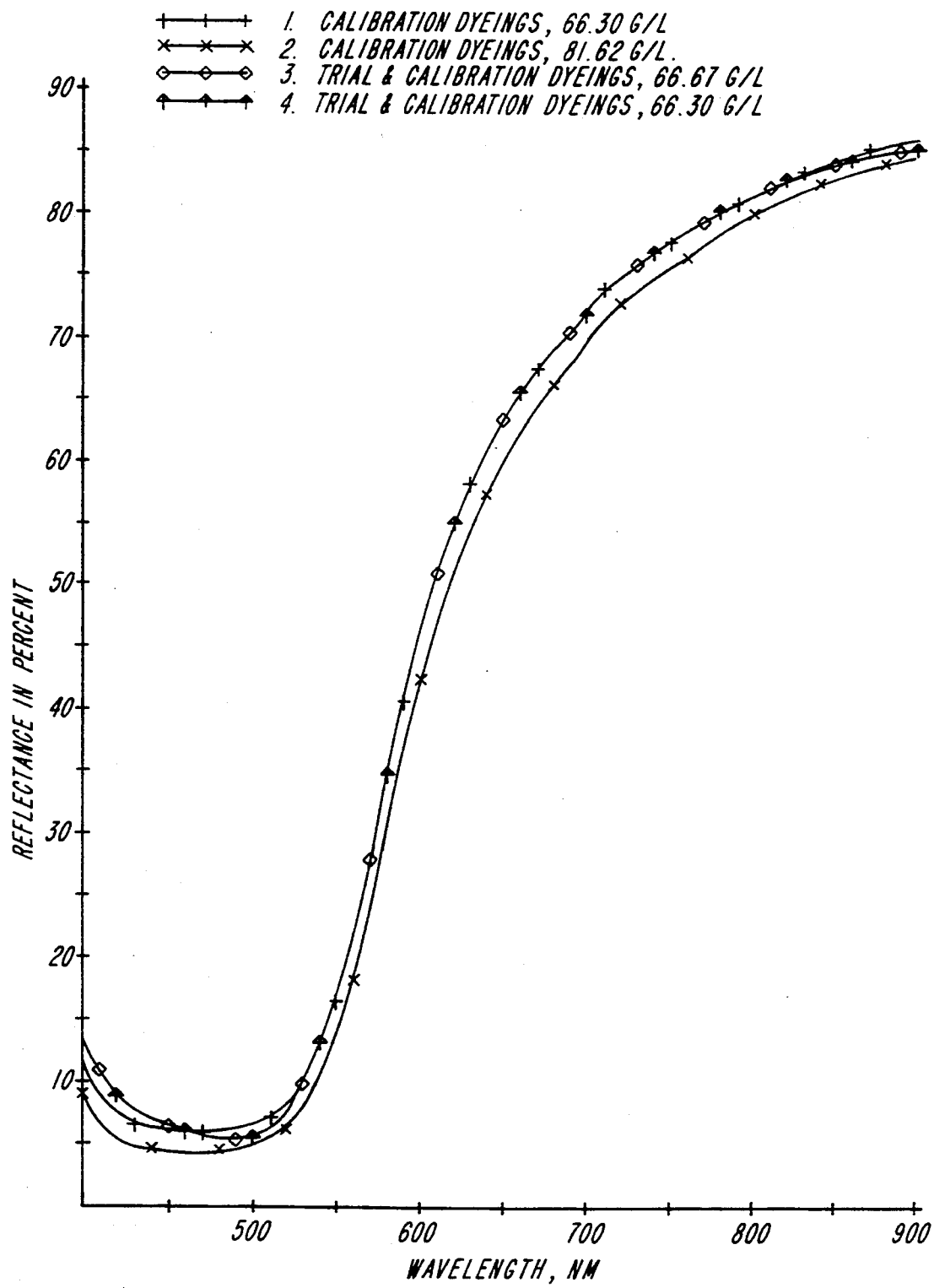

Yellow 5GF was also used in the formulation for Brown 356. See FIG. 5. Since the plots 1 to 4 of FIG. 5 are quite similar in shape to the plots 1 to 4 of FIG. 1 and the dye is the same, FIG. 5 corroborates the analysis as presented in FIG. 1. The same analysis can be applied to Brilliant Green FFB, and Orange RRTM and which are used with both the Dark Green 355 and the Brown 356 formulations, but is not repeated herein for the sake of brevity of explication. Thus, the corresponding plots confirm each other.

Dyes can interact during the dyeing process, and confound the color formulation calculations. Using this invention the extent of their interaction can be examined/determined. Plots 4 of FIGS. 1–8 are based on the a priori primary dyes which have been corrected to behave like the current dye batches and the current cloth. In the particular case of Yellow 5GF, a dyeing can be prepared at a concentration of "23.90" g/L using the current dye batch of that dye (only) and a spectrum obtained for comparison with plot 4 of FIG. 1. In many cases the two spectra will be congruent. However, where there are interactions between the Yellow 5GF and another dye or dyes in the formulation, the two spectra will differ, and the extent of the difference is a measure of the degree of interaction. Knowledge of these interactions is quite important in the color matching procedure.

MATHEMATICAL IMPLEMENTATION

The additive function used is the usual Kubelka-Munk relation:

$$K/S = (1-R)^2/2R \qquad (1)$$

where K is the absorption coefficient, S is the scattering coefficient, and R is the percent reflectance of the sample.

In the process of calculating a formulation, a relationship between the K/S values (parameters) and the corresponding concentrations is needed at each wavelength to permit interpolation. The problem is to calculate the coefficients, V, of the mathematical model chosen to relate the K/S values to the concentrations at each wavelength. Among other ways, this can be done by least squares. The solution is, in matrix notation, $$V = (X^T X)^{-1} X^T Y \qquad (2)$$

where V is the coefficient vector, X is the matrix of the dye concentrations, and Y is a vector consisting of the K/S values.

Since a formulation usually requires several dyes, the above calculation of V is carried out for each. This requires several sets of computations, one for each dye.

In general, suppose dyes R, G, and B are being used, that each has six (6) primaries (concentration levels of dye on cloth), and the linear model relating K/S values and concentration at each wavelength is a cubic polynomial. First consider the approach where the calculations needed for interpolation for each dye are carried out separately. The six primary dyeings provide six equations at each wavelength read by the spectrophotometer:

$$\begin{aligned} v_0 + v_1 r_1 + v_2 r_1^2 + v_3 r_1^3 &= (K/S)_1 \\ v_0 + v_1 r_2 + v_2 r_2^2 + v_3 r_2^3 &= (K/S)_2 \\ &\vdots \\ v_0 + v_1 r_6 + v_2 r_6^2 + v_3 r_6^3 &= (K/S)_6 \end{aligned} \qquad (3)$$

Here the values of $v_0$, $v_1$, $v_2$, and $v_3$ comprise the V vector in equation (2) given above. The r's are the a priori concentrations of the R dye. The K/S values are obtained from the values of the reflectance as in the equation (1) above. This is an overdetermined system of equations and can be solved by least squares. One takes the partial derivatives of the sums of squares of the differences with respect to $v_0$, $v_1$, $v_2$, and $v_3$, sets them equal to zero, and solves for the coefficients, usually by Gaussian elimination. Similarly, for the G and B dyes.

To combine the trial dyeing with the set of primaries used, one has to arrange the calculations so that the trial dyeing and the primaries are considered simultaneously. This is done by rewriting equation (3) in the similar form of equation (4).

$$(v_0+v_1r+v_2r^2+v_3r^3+v_4+v_5g+v_6g^2+v_7g^3+v_8+v_9b+v_{10}b^2+v_{11}b^3-K/S)^2 \quad (4)$$

Here, again, the r, g, and b values are the a priori concentrations of the R, G, and B dyes at the six primary dyeing levels. The solution is again given by Equation 2.

Equation (4) is mathematically the same as equation (3), above, since, for the first dye R, g and b, which are the concentrations of the second and third dyes, are known to be zero. For the second dye, G, the concentrations, r and b, are zero, and for the third dye, B, the concentrations r and g are zero. When one proceeds with the least squares calculations, one obtains exactly the same v's as before, as expected.

However, since the values of the dye concentrations, r, g, and b, as well as the K/S values are all known for each trial dyeing, they too can be substituted in equation (4). Equation (4) can, therefore, be applied to the R, G, and B dyes individually as well as the trial dyeing (which also simultaneously uses the R, G, and B dyes). This combined set of equations with one equation for each trial dyeing can now be solved by the least squares procedure since the maximum number of equations which can be used is not limited. A new set of coefficients, the v's, are obtained, and an improved formulation results. See Table, formulations (3) and (7).

Because of the importance of the trial dyeing relative to the primaries, it is preferred that the former be mathematically weighted. In this case there are a total of nineteen (19) equations of type four (4); one for each of the concentration levels of the a priori primary dyes in the formulation and one for the trial dyeing. For these calculations the weight assigned to equation (4) above for the trial dyeing was selected to be eight (8), the weight for each of the other eighteen (18) equations was selected to be unity. Other weightings or ways to differentially treat the trial dye concentrations can be employed without departing from the inventive concept.

Use of the least squares procedure requires that the number of equations cannot be less than the number of unknowns, $v_0$ to $v_{11}$. One can have many more equations, and thereby include several trial dyeings, using equation (4) for each. Thus prior and current trial dyeings based on the particular set of dyes and dye batches may also be included. Trial dyeings with fewer than 3 dyes, e.g. R & G only (b=o), or more than three dyes, with the appropriate mathematical modifications, can also be included in the computations if desired. If a large number of recent trial dyeings involving the dyes to be used are available, the importance and need for the a priori primary dye data diminishes.

These calculations are carried out for each wavelength for which there is data resulting in sets of corrected coefficients, v's, one set for each wavelength and each dye. These coefficients can then be used in the formulation procedure to calculate the corrected concentrations, either by the colorimetric or the spectrophotometric algorithms that are well-known to those skilled in the art.

Many modifications of the presently disclosed invention will become apparent to those skilled in the art having benefitted from the disclosure of the instant invention.

What is claimed is:

1. A method that utilizes trial dyeings to improve color formulations, comprising the steps of:

selecting a target shade and sets of a priori dyes from a data base, and relating concentrations to parametrized reflectance at the different wavelengths used for each dye;

calculating the concentrations of the dyes in each set of a priori dyes that gives the best color match to the target shade using in a predetermined manner as required by the mathematical implementation an additive function relating a parameter to the reflectance of the target shade;

preparing a first trial dyeing using the dyes and calculated concentrations of the expected best color match;

calculating from the prepared first trial dyeing its constituent first trial dye concentrations, where any variance in the constituent first trial dye concentrations found with the first trial dye concentrations calculated earlier and used is indicative of error such as introduced by different dye substrates, by dye batches different from those used to dye the primary dyes, or by inaccuracies in the additive function; then obtaining a color formulation to match the selected target shade by modifying the data base in a two-step computerized mathematical calculation wherein the target shade is not modified an follows:

combining the a priori data base with the constituent first trial dye data to obtain a combined and corrected data base, by relating concentrations to parametrized reflectance of both the a priori dyes and the first trial dyeing; and calculating second constituent trial dye concentrations of the dyes based on the corrected data base and the spectrum of the target color for dyeing and comparison with the target color for acceptability and use using an additive function relating a parameter to reflectance.

2. The invention of claim 1, further including the step of permanently storing the corrected data base.

3. The invention of claim 1, further including the step of dyeing additional trial dyeings and using the additional constituent trial dye concentrations to further improve or verify the corrected concentrations.

4. The invention of claim 1, wherein the constituent first trial dye concentration calculating step is accomplished spectrophotometrically.

5. The invention of claim 1, wherein the constituent first trial dye concentration calculating step is accomplished colorimetrically.

6. The invention of claim 1, wherein the constituent first trial dye concentration calculating step is accomplished with transmitted light.

7. The invention of claim 1, wherein the constituent first trial dye concentration calculating step is accomplished with reflected light.

8. The invention of claim 1, wherein said additive function is the Kubelka-Munk relation and the parameter is a Kubelka-Munk value.

9. The invention of claim 8, wherein said predetermined manner is a series of simultaneous equations relating Kubelka-Munk values to a linear model of concentration coefficients that are solved by least squares.

10. A method that utilizes colored trial samples to improve color formulations, comprising the steps of:

selecting a target shade and sets of a priori colorants from a data base, and relating concentrations to parametrized reflectance at the different wavelengths used for each colorant;

calculating the concentrations of the colorant in each set of a priori colorants that gives the best color match to the target shade using in a predetermined manner an additive function relating a parameter as required by the mathematical implementation to the reflectance of the target shade;

coloring a first trial sample using the colorants and calculated concentrations of the expected best color match;

calculating from the colored trial sample its constituent first trial colorant concentrations, where the variance in the constituent first trial colorant concentrations found with the first trial colorant concentrations calculated earlier and used is indicative of error such as introduced by different substrates, by colorant batches different from those used to color the primary samples, or by inaccuracies in the additive function; then obtaining a color formulation to match the selected target shade by modifying the data base in a two-step computerized mathematical calculation wherein the target shade is not modified as follows:

combining the a priori data base with the constituent first trial colorant data to obtain a combined and corrected data base, by relating concentrations to parametrized reflectance of both the a priori colorants used and the first trial sample; and calculating second constituent trial colorant concentrations of the colorants used based on the corrected data base and the spectrum of the target shade for coloring and comparison with the target shade for acceptability and using an additive function relating a parameter to reflectance.

11. The invention of claim 10 wherein said colored trial samples are painted samples.

12. The invention of claim 10 wherein said colored trial samples are inked samples.

13. The invention of claim 10 wherein said colored trial samples are substrates formed of plastic material.

14. The invention of claim 10 wherein said colored trial samples are formed by the action of electromagnetic radiation on colorant sensitizers and colorants such as occur in color photography.

15. The invention of claim 10 wherein the color of the screen of a television set could be used in place of a colored trial sample.

* * * * *